United States Patent [19]

Banzi, Jr. et al.

[11] Patent Number: 4,688,209

[45] Date of Patent: Aug. 18, 1987

[54] METHOD AND APPARATUS FOR LOOPING AROUND A DIGITAL TRANSMISSION LINE AT A CHANNEL UNIT

[75] Inventors: Frederick J. Banzi, Jr., Andover; Michael J. Dugan, Merrimac, both of Mass.; Randolph W. Johnson, Northbrook; Douglas D. Saylor, Naperville, both of Ill.; Craig A. Sharper, Bradford, Mass.

[73] Assignee: American Telephone and Telegraph Company, AT&T Bell Laboratories, Murray Hill, N.J.

[21] Appl. No.: 675,121

[22] Filed: Nov. 27, 1984

[51] Int. Cl.[4] .............................................. H04J 1/16
[52] U.S. Cl. ......................................... 370/15; 379/5
[58] Field of Search ................... 375/10; 179/175.3 F, 179/175.31 R; 371/22, 25; 370/14, 15

[56] References Cited

U.S. PATENT DOCUMENTS

| | | | |
|---|---|---|---|
| 3,652,993 | 3/1972 | Bridwell et al. | 340/147 R |
| 3,917,916 | 11/1975 | Ghosh et al. | 179/175.31 R |
| 4,006,456 | 1/1977 | Wilk | 371/22 |
| 4,161,634 | 7/1979 | Bellisio | 178/2 C |
| 4,161,635 | 7/1979 | Wolaver | 179/175.31 R |
| 4,279,032 | 7/1981 | Smith | 370/15 |
| 4,564,933 | 1/1986 | Hirst | 370/15 |

OTHER PUBLICATIONS

*IEEE Transactions on Communications*, vol. COM-30, No. 9, Sep., 1982, New York, L. W. Campbell et al., "Maintenance Operations for the Circuit-Switched Digital Capability", pp. 2053-2056.
*The Bell System Technical Journal*, vol. 61, No. 4 Apr., 1982, F. H. Keeve et al., "No. 10A Remote Switching System: System Maintenance", pp. 597-625.

*Primary Examiner*—Benedict V. Safourek
*Assistant Examiner*—M. Huseman
*Attorney, Agent, or Firm*—Richard J. Godlewski

[57] ABSTRACT

Method and apparatus for looping around a digital transmission line (150) at a predetermined channel unit (172) to test the line from either end of the line. Each channel unit in the line is responsive to a first and a second received control code to perform one of two operations. When the first and second received control codes are both first predetermined control codes from one end of the line, the data channel assumes a state to pass the second received first control code and any subsequently received control codes to the next channel unit. However, when the first and second received control codes are first and second predetermined control codes from the one end of the line, respectively, the data channel unit connects the transmit path from the one line end to the receive path back to the one line end, thus looping back to the digital transmission line. To loop around a line at a predetermined channel unit, a maintenance circuit (152) at one line end applies an individual first predetermined control code for the predetermined channel unit and each of the intermediate channel units followed by the application of a second predetermined control code for the predetermined channel unit. The first channel unit from the end of the line passes the second received first control code and any subsequently received control codes to the next channel. This continues for each unit until the predetermined channel unit receives only a first and a second predetermined control code. The second received second control code causes the unit to loop around the transmission line. A maintenance circuit at the other end of the line can likewise loop around the line at any channel unit. A third predetermined control code causes each of the receiving channel units to return to their previous data transmission state.

16 Claims, 8 Drawing Figures

METHOD AND APPARATUS FOR LOOPING AROUND A DIGITAL TRANSMISSION LINE AT A CHANNEL UNIT

RELATED APPLICATION

This application is related to the application of F. J. Banzi, Jr., M. J. Dugan, and C. A. Shartper, Ser. No. 675,123, filed concurrently with this application on Nov. 27, 1984.

TECHNICAL FIELD

This invention relates generally to digital transmission lines and particularly to method and apparatus for looping around a digital transmission line at a predetermined channel unit back to one end of the line.

BACKGROUND OF THE INVENTION

A digital transmission line between a customer and a telecommunications switching office or between two switching offices is commonly terminated with two channel units interconnected by a channel of a digital carrier facility. Typically, groups of channel units are inserted into terminal equipment, and the signals on each of the lines are multiplexed together for transmission on the digital carrier facility. The terminal equipment at the other end of the facility demultiplexes the signals and distributes the signals to the individual channel units. For short distances or where there is a complete group of lines designated for the same destination, only a single pair of channel units may be required for a single transmission line. However, for long distances or where a customer is connected through several carrier facilities before termination in a switching office, the digital transmission line is terminated by two or more pairs of terminating channel units, each pair terminating a channel of a carrier facility. The cross-connection between the channel units of two different carrier facilities is usually not through a switching system and may not even be colocated with a switching system. Thus, the testing of a faulty line and particularly a channel unit not cross-connected through a switching system becomes time consuming and very costly if maintenance personnel are not available at each cross-connection of terminating channel units.

Prior art solutions have addressed this testing problem in a number of different ways. One prior art solution is to provide a separate test line that is connected to each channel unit used with a particular transmission line. A series of test signals is applied at one end of the transmission line for all of the channel units in the transmission line. Each channel unit sends back a response signal on the test line. The delay between each test signal received on the test line is used to determine where a faulty portion of the transmission line or channel unit exists. The obvious problem is the added cost of a separate test line for each transmission line. Furthermore, portions of the line cannot be selectively looped around to perform more extensive tests on the transmission line and channel units.

Another prior art solution is to loop around the transmission line at a selected channel unit and then test the transmission line. The channel unit loops around the line in response to a specific address sent on the line to the designated channel unit. The problem with this solution is that each channel unit only responds to a unique address signal associated with that unit. Thus, each unit must be manufactured to respond only to the associated address signal, and maintenance personnel must know and keep records of the individual address signals. Again, this solution is costly and difficult to administer.

SUMMARY OF THE INVENTION

The foregoing problems of testing a digital transmission line are solved and a technical advance is achieved by method and apparatus for interconnecting the transmit and receive paths of a digital transmission at predetermined channel unit by sending two control codes to each channel unit. Each channel unit is responsive to a first and a second received first predetermined control code for passing the second receipt of a first control code and any subsequently received control codes through the channel unit. Each channel unit is also responsive to a first receipt of a first predetermined control code and a second received second predetermined control code for interconnecting the transmit and receive paths of the transmission line at the channel unit. Thus, a digital transmission line is looped around back to the one end. The method involves applying at one end of the line an individual first predetermined control code for the predetermined channel unit and for each one of the channel units between the one end of the line and the predetermined channel unit. In addition, a second predetermined control code for the predetermined channel unit is applied to the one end of the line after the first predetermined control codes have been applied.

In one illustrative embodiment of the invention to loop around a digital transmission line at the third of four channel units in a digital transmission line, three first predetermined control codes are applied to one end of the line followed by one second predetermined control code for the third channel unit. The first channel unit upon receipt of the first two first control codes translates the first received first control code to data and passes the second received first control code and any subsequently received control codes on to the next unit. Similarly, the second channel unit upon receipt of the second and third transmitted first control codes passes the third transmitted first control code and the second control code on to the third channel unit. Since the third channel unit only receives one first and one second control code, the channel unit loops the digital transmission line around upon receipt of the second predetermined control code. Likwise, any channel unit in a digital transmission line can loop around the line back to one end dependent only on the number of first and second control codes that are applied to the line.

In accordance with another feature of this invention, a third predetermined control code may be sent to each of the channel units in a looped around line to cause the units to return to their original transmission state and disconnect the interconnected transmit and receive paths.

In accordance with still another feature of this invention, this loop around method can be implemented with only two maintenance codes. The first control code comprises a plurality of alternating first and second maintenance codes. The second control code comprises a plurality of first maintenance codes, and the third control code comprises a plurality of second maintenance codes.

In accordance with yet another feature of this invention, each data channel unit comprises two loopback circuits responsive to control codes from either end for looping around a digital transmission line back to the end of the line where the control codes were applied.

BRIEF DESCRIPTION OF THE DRAWING

The invention may be better understood from the following detailed description when read with reference to the drawing in which.

DETAILED DESCRIPTION

Figure 1:
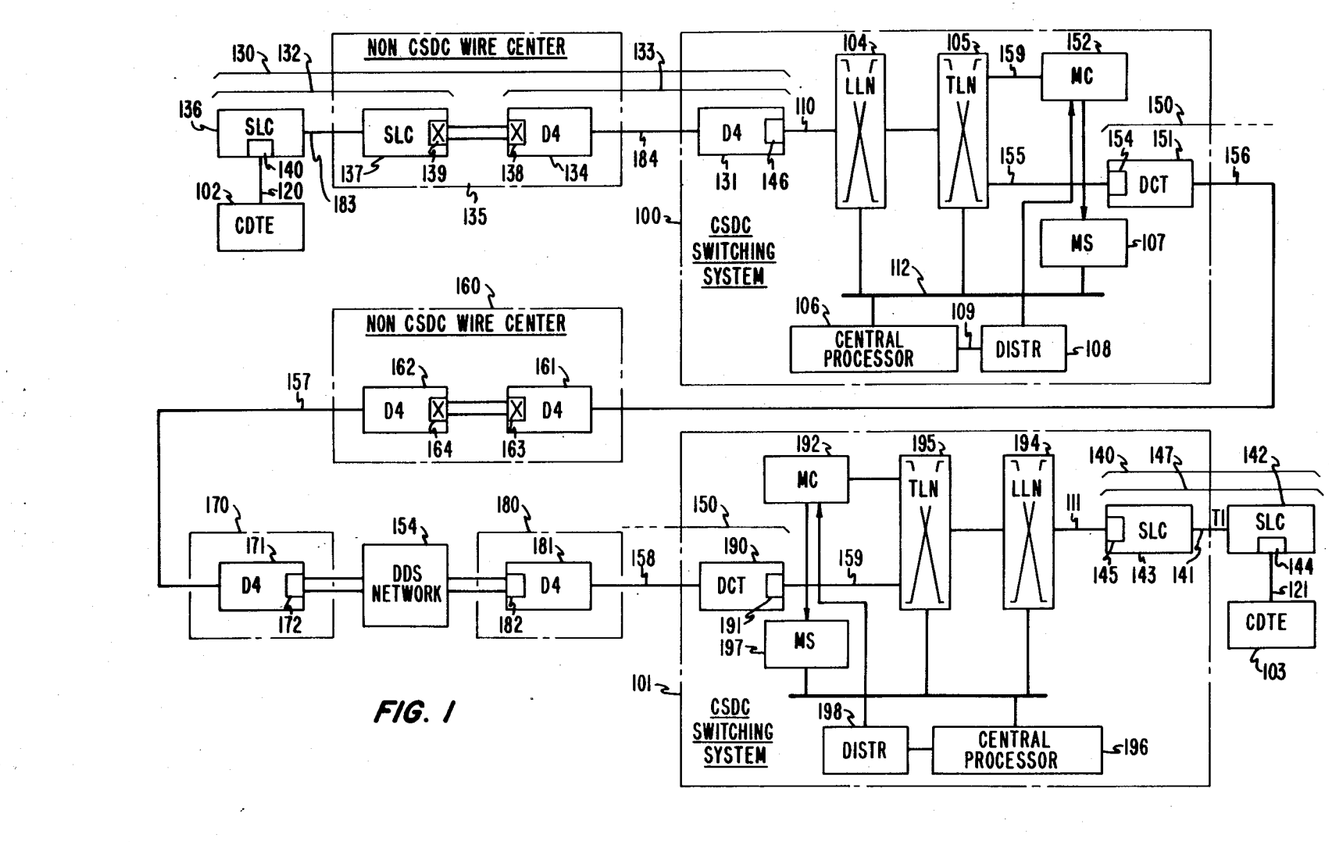
FIG. 1 shows a block diagram of a telecommunication system for looping around a digital transmission line at a predetermined channel unit.

The general organization of a telecommunications system employing the invention for connecting the transmit path to the receive path of a digital transmission line at a predetermined channel unit to loop around the line back to one end is illustrated in the block diagram of FIG. 1. Each of telephone switching offices 100 and 101 is equipped with circuit-switched data capability (CSDC) available from AT&T Technologies, Inc. to serve a plurality of data-voice customers such as respective customers 102 and 103. Each of data-voice customers 102 and 103 have customer data terminal equipment which is also available from AT&T Technologies, Inc. to provide voice and data communications over the same customer line such as 130 and 140, respectively. By way of example, each of telephone switching offices 100 and 101 is suitably an electronic program-controlled switch of the type disclosed in U.S. Pat. No. 3,570,008, to R. W. Downing et al., of Mar. 9, 1971, and similarly disclosed in *The Bell System Technical Journal,* Vol. 43, No. 5, Parts 1 and 2, September, 1964. These citations may be referred to for a more comprehensive understanding of the construction and operation of an electronic program-controlled switch, but a brief description will be given herein to illustrate how the invention functions with CSDC equipped telephone switching offices 100 and 101.

Switching office 100 includes line link network 104, trunk link network 105, and a stored program-controlled central processor 106. Line link network 104 provides a plurality of terminations for customer two-wire metallic lines. As shown, customer line 130 interconnects customer 102 and line link network 104 via two-wire metallic connections 110 and 120. When a data-voice customer such as customer 102 is not directly connected to or is a long distance from a circuit-switched data capability equipped switching office such as office 100, the customer is connected to a CSDC equipped office via one or more well-known digital carrier systems such as 132 and 133. As shown, one channel of carrier systems 132 and 133 is interconnected at non-CSDC equipped wire center 135 to form a complete path for customer line 130. This interconnection is typically colocated with a non-CSDC equipped switching system located near the customer; however, the interconnection is not through the non-CSDC switching system. Carrier facility system 132 such as the well-known subscriber loop carrier system available from AT&T Technologies, Inc. interconnects data-voice customer 102 and wire center 135. Carrier system 132 includes carrier facility 183 terminated at the ends by digital carrier terminal equipment 136 and 137. Similarly, digital carrier terminal equipment 131 and 134 such as well-known D4 channel bank terminal equipment terminate the ends of carrier facility 184 in carrier system 133.

The terminal equipment at each end of a carrier facility usually includes a number of channel units that are each associated with an individual customer line. In this embodiment, the two-wire metallic connection 120 of customer 102 is connected to digital carrier terminal equipment 136 via a commercially available data-voice subscriber channel unit 140. Carrier terminal equipment 136 is commonly located in close proximity to a plurality of customers served by the equipment. In a similar fashion, two-wire metallic connection 110 from line link network 104 is connected to carrier terminal equipment 131 via a corresponding commercially available data-voice office channel unit 146.

At intermediate wire center 135, plug-in data channel units 138 and 139, as will be described hereinafter, are inserted into respective carrier terminal equipment 134 and 137 and interconnected to form a complete voice and data path betwee CSDC switching office 100 and customer 102. Depending on the location of a data-voice customer with respect to a CSDC equipped switching office, a customer may be interconnected to a CSDC switching office through one or more intermediate non-CSDC wire centers similar to wire center 135. In a manner similar to that of carrier system 132, carrier system 147 interconnects line link network 194 of CSDC swtiching office 101 and data-voice customer 103. Carrier system 147 includes carrier facility 141 terminated at the ends by digital carrier terminal equipment 142 and 143. Data-voice subscriber channel unit 144 interconnects temrinal equipment 142 and two-wire metallic connection 121 of customer 103. Corresponding data-voice office channel unit 145 interconnects terminal equipment 143 and two-wire metallic connection 111 of line link network 194.

Trunk link network 105 provides terminations for a plurality of interoffice trunks such as interoffice digital trunk 150 which is terminated at switching office 100 via well-known digital carrier trunk system terminal equipment 151 and at switching office 101 via similar terminal equipment 190. Two-wire metallic connection 155 connects one end of digital trunk 150 to trunk link network 105, whereas two-wire metallic connection 159 connects the other end of the trunk to trunk link network 195 at switching office 101. Trunk link network 105 also provides terminations for maintenance circuit 152 and other miscellaneous service circuits which have not been shown to simplify the drawing.

Under the control of central processor 106, maintenance circuit 152 may be connected through the line and trunk link networks to any selected data-voice customer line to test the line as well as equipment therein. Similarly, maintenance circuit 152 may be selectively connected to any interoffice digital trunk for testing the trunk and the equipment therein.

Further responsive to central processor 106, maintenance circuit 152 can signal a predetermined data channel unit such as 138 or 139 to connect the transmit path to the receive path of a line to loop around a customer line or digital trunk back to one end of the line and the maintenance circuit to test portions of the line or trunk. This is accomplished by sending serially two control codes to the predetermined data channel unit to loop around the line or trunk and two control codes to each of the intermediate data channel units to pass on the second one of the two codes and any subsequently received control codes to the next data channel unit.

The majority of the control, supervisory, and translations functions required for the operation of this telephone switch are performed by central processor 106. A typical central processor suitable for use in the illustrative switch is described in *The Bell System Technical Journal,* Vol. 56, No. 2, February, 1977. Central processor 106 interfaces with lines, trunks, and service circuits such as maintenance circuit 152 via well-known scanners such as 107 and well-known distributors such as 108. Distributor 108 responds to an order over bus system 109 from central processor 106 to apply pulses to distribution points connected to various peripheral units of equipment such as maintenance circuit 152. Scanner 107 gathers information and reports on communication bus 112 to the central processor by monitoring leads connected to the various peripheral units such as maintenance circuit 152.

Similarly, switching office 101 comprises corresponding line link network 194, trunk link network 195, central processor 196, maintenance circuit 192, and miscellaneous equipment such as scanner 197 and distributor 198 as previously described.

Switching offices 100 and 101 equipped with circuit-switched data capability are interconnected by interoffice digital trunk 150. Interoffice digital trunk 150 includes a plurality of serially connected digital carrier facilities 156–158. Well-known and commercially available digital carrier terminal equipment terminates the ends of each digital carrier facility. For example, digital carrier trunk system terminal equipment 151 available commercially from AT&T Technologies, Inc. terminates digital carrier facility 156 at switching office 100. A combined alternate data-voice channel unit plug-in 154 connects a channel of terminal equipment 151 to trunk link network 105 via two-wire metallic connection 155. The other end of transmission facility 156 is terminated at non-CSDC capability wire center 160 with well-known digital terminal equipment such as D-4 channel bank terminal equipment 161. Each end of digital transmission facility 157 is likewise terminated at non-CSDC wire centers 160 and 170 with digital terminal equipment 162 and 171, respectively. Each one of digital terminal equipment 161 and 162 contains a plurality of channel units. Data channel units 163 and 164 in respective terminal equipment 161 and 162 are interconnected to form a four-wire data-voice communication path through wire center 160. Digital data system network 154 forms a four-wire path between data channel unit 172 in terminal equipment 171 and data channel unit 182 in digital terminal equipment 181 located in non-CSDC wire center 180. The digital data system network is described in *The Bell System Technical Journal,* Vol. 54, No. 5, May-June, 1975. Digital carrier systems facility 158 interconnects wire center 180 and circuit-switched data cability switching office 101. Digital carrier trunk system terminal equipment 190 terminates digital carrier facility 158 at switching office 101. Combined alternate data-voice channel unit plug in 191 terminates trunk 150 at switching office 101 via two-wire metallic connection 159 to trunk link network 195.

As previously suggested, maintenance circuits 152 and 192 in respective circuit-switched data capability switching offices 100 and 101 can test selected portions of an interoffice digital trunk such as 150 by causing a predetermined data chanenl unit in the line to loop around the digital transmission line. In response to a first received first control code and a second received second control code from the maintenance circuit, the predetermined channel unit connects the transmit path to the receive path of the four-wire carrier channel. Maintenance circuit 152 can perform tests on interoffice trunk 150 from one end, whereas maintenance circuit 192 can test the transmission line from the other end of the trunk at switching office 101. Furthermore, when data channel units such as 138 and 139 are interposed between a circuit-switched data capability switching office and a data-voice customer, the maintenance circuit can selectively cause a predetermined data channel unit to loop around the transmit and receive paths of the four-wire carrier facility to test portions of the subscriber line.

Figure 2:
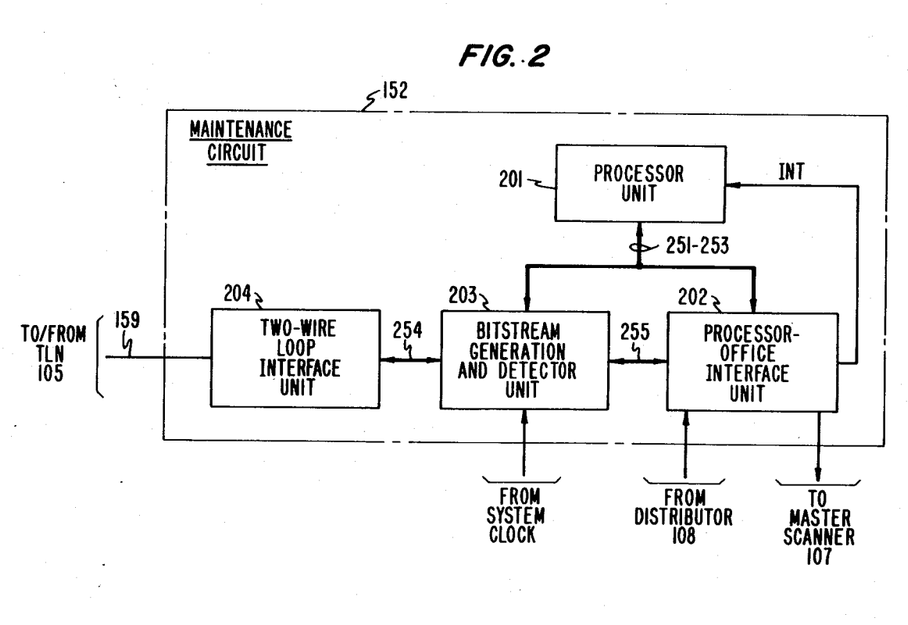
FIG. 2 is an illustrative block diagram of a maintenance circuit in the diagram of FIG. 1 for sending control codes to loop around interoffice digital trunks at at a predetermined data channel unit.

Depicted in FIG. 2 is an illustrative block diagram of maintenance circuit 152 for testing interoffice digital trunks and subscriber carrier lines with loop-around data channel units. Maintenance circuit 152 comprises processor unit 201, processor-office interface unit 202, and bitstream signal generator and detector unit 203 interconnected by address, data, and control buses 251 through 253. In addition, maintenance circuit 152 further includes two-wire loop interface unit 204 interconnected to bitstream generator and detector unit 203 by miscellaneous leads 254. Similarly, bitstream generator and detector unit 203 is connected to processor-office interface unit 202 via miscellaneous leads 255. Processor unit 201 controls the addressing, testing, and reporting operations of maintenance circuit 152 in response to control signals received from central processor 106 via distributor 108 and processor-office interface unit 101. In addition, processor unit 201 also controls the reporting of test results to central processor 106 via processor-office interface unit 202 and scanner 107.

Maintenance circuit 152 causes a digital transmission line to loop around at a predetermined channel unit by serially sending two different consecutive control codes to the predetermined data channel unit and two like consecutive control codes to each data channel unit between the maintenance circuit and the predetermined data channel unit. Each data channel unit can assume any one of five different states depending on the control codes received from the maintenance circuit. These five states are illustrated in the state diagram of FIG. 8. In response to a first received first predetermined control code, a data channel unit in a "data transmission" state will assume a "maintenance" state and translate or map the first received first predetermined control code to data. Thus, the first received first predetermined control code is not passed onto the next data channel unit. A data channel unit remains in the "maintenance" state until another control code is received from the maintenance circuit. When the second received control code is another first predetermined control code, the data channel unit assumes the "disable loopback" state and passes the second received first predetermined control code to the next data channel unit. This passed second received first control code becomes the first received first predetermined control code for the next data channel unit. Any subsequently received control codes are also passed on to the next data channel unit. When the second received control code of a data channel unit is a second predetermined control code, the data channel unit in the "maintenance state" assumes the "loopback" state and connects the transmit path to the received path of the line to loop around the transmission line back to the maintenance circuit. A data channel unit in the "loopback" state passes all information back to the maintenance circuit. The receipt of a third predetermined control coded returns any data channel unit back to the "data transmission" state.

The maintenance circuit sends these control codes to channel units by applying various combinations of two one-byte maintenance codes. The first predetermined control code consists of 48 bytes of alternating first and second maintenance codes followed by 48 bytes of random data words. These 48 bytes of random data words are used to separate first control codes. The second control code consists of 48 bytes of the first maintenance code, and the third control code consists of 48 bytes of the second control codes.

By way of example, when the maintenance circuit wants to loop around a transmission line at the third data channel unit from the end of the line, the maintenance circuit will serially send three consecutive first predetermined control codes followed by a second predetermined control code. The first data channel unit translates the first received control code to data and passes the second through fourth received control codes to the next unit upon receipt of the second received first predetermined control code. Responding like the first unit, the second data channel unit translates the first received first control code to data and passes the one remaining first predetermined control code and the second predetermined control code to the third data channel unit. The second control code received by the third data channel unit is a second predetermined control code, and the third channel unit in response to the first received first predetermined control code and the second received second predetermined control code loops around the transmission line back to the maintenance circuit. To disconnect the transmit path from the received path of the transmission line at the third data channel unit and return the units to the "data transmission" state, the maintenance circuit sends a third predetermined control code on the line to the data channel unit. This method of looping around a digital transmission line at a predetermined channel unit can be utilized with any number of loop-around data channel units.

Figure 3:
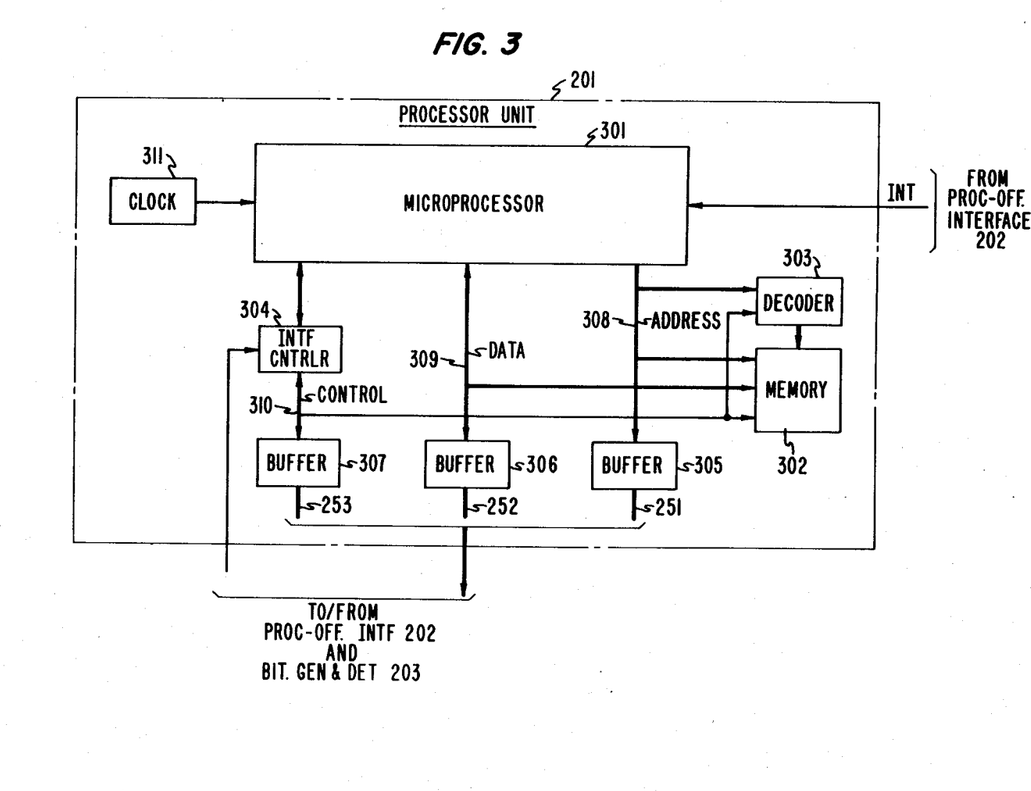
FIG. 3 is an illustrative detailed block diagram of a processor unit in the maintenance circuit of FIG. 2.

An illustrative detailed block diagram of processor unit 201 is depicted in FIG. 3. Processor unit 201 comprises a well-known processor configuration of commercially available devices such as microprocessor 301, random access memory 302, address decoder 303, interface controller 304, and bus interface buffers 3-5 through 307 interconnected as shown by internal address, data, and control buses 309-310. Processor unit 201 also includes clock circuit 311 for providing various well-known timing and synchronization signals to microprocessor 301.

Microprocessor 301 executes program instructions stored in random access memory 302 to control the various addressing, testing, and reporting functions of maintenance circuit 152. The microprocessor can also be interrupted in a well-known manner from processor-office interface unit 202 to perform program instructions associated with predetermined functions.

Random access memory 302 is a temporary and erasable memory for storing the program instructions to operate microprocessor 301 and for storing the results received from tests performed on a digital transmission line. Random access memory 302 is addressed via internal address bus 308 in response to well-known enable signals received from decoder 303 and interface controller 304. Interface controller 304 also provides read/write control signals to the other units of maintenance circuit 152 in response to control signals from microprocessor 301. Bus interface buffers 305-307 drive respective maintenance circuit address, data, and control buses 251-253 in response to signals from microprocessor 301 received on internal address, data, and control buses 308-310, respectively. Furthermore, bus interface buffer 306 is a bidirectional device for transferring data from maintenance circuit data bus 252 to internal data bus 309.

Figure 4:
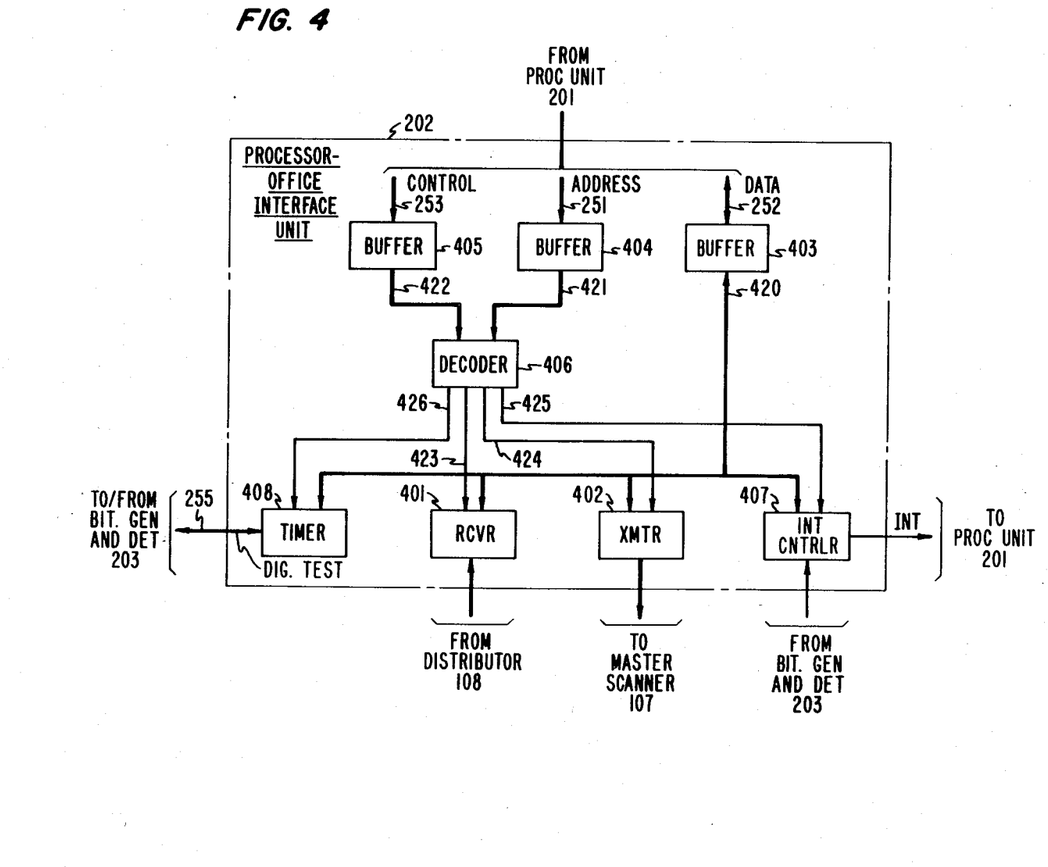
FIG. 4 shows a detailed block diagram of the processor-office interface unit in the maintenance circuit of FIG. 2.

Depicted in FIG. 4 is processor-office interface unit 202 for transferring signals between central processor 106, processor unit 201, and the remaining units of maintenance circuit 152. Processor-office interface unit 202 comprises a plurality of well-known circuits such as receiver 401, transmitter 402, bus interface buffers 402-405, decoder 406, interrupt controller 407, and timer 408 interconnected as shown by interface data, address, and control buses 420-422 and miscellaneous control leads 423-426. Receiver 401 converts the serial bipolar test control signals received from central processor 106 to a parallel format for processor unit 201 via interface data bus 420 and bus interface buffer 403. In a similar manner, transmitter 402 converts the parallel format test result signals on interface data bus 420 from processor unit 201 for central processor 106 by saturating a selective plurality of well-known ferrods in scanner 107.

Interrupt controller 407 generates an interrupt signal to microprocessor 301 in response to various address, test, and report control signals received from unit 203. Timer 408 provides various timing signals to the maintenance circuit in response to bit error signals from from bitstream generator and detector circuit 203. Decoder circuit 406 provides enable signals to receiver 401, transmitter 402, interrupt controller 407, and timer 408 in response to address and control signals received from microprocessor 301. Bus interface buffers 403-405 buffer the signals received from respective maintenance circuit address, data, and control buses 251-253.

Figure 5:
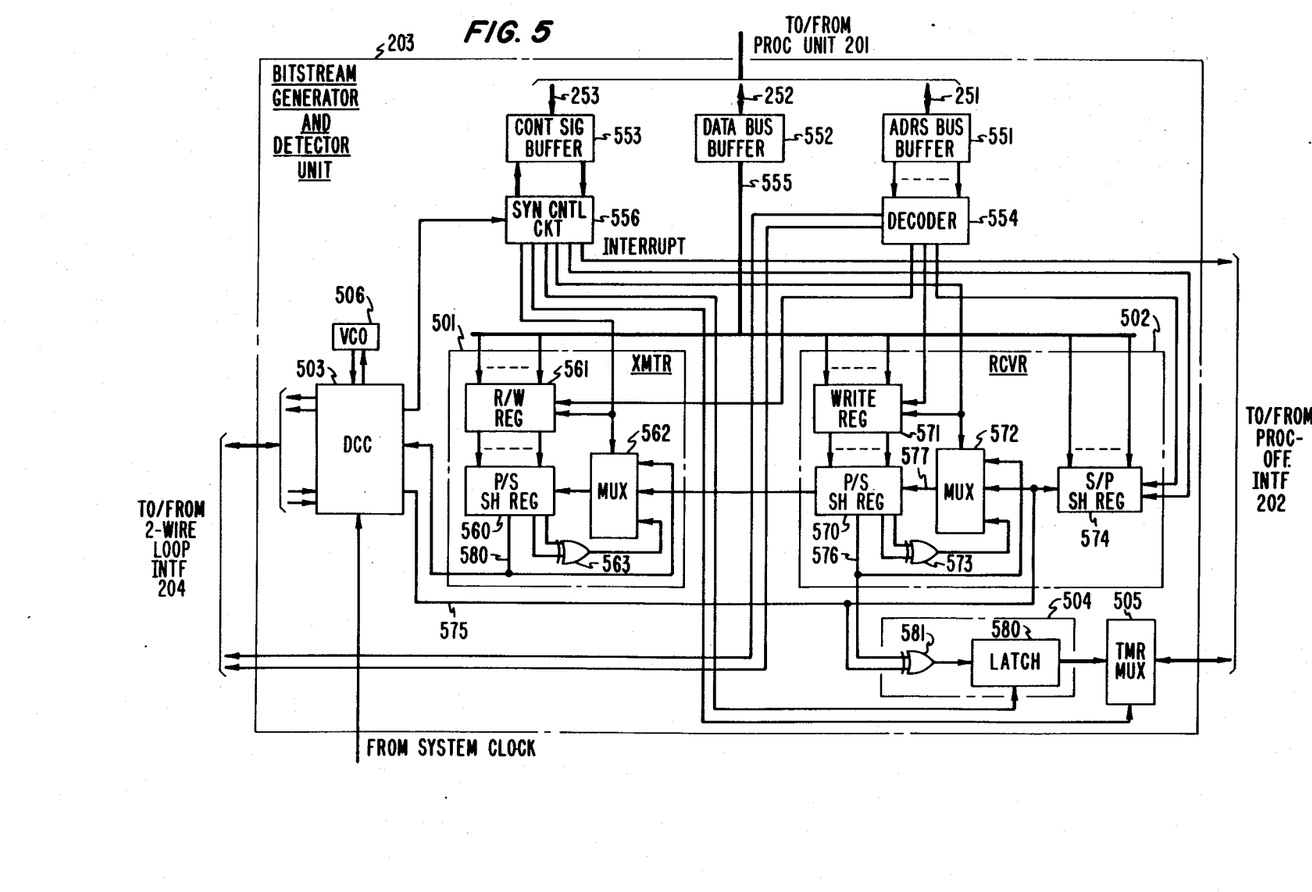
FIG. 5 depicts a detailed block diagram of the bitstream generator and detector unit in the maintenance circuit of FIG. 2.

Depicted in FIG. 5 is a detailed block diagram of bitstream generator and detector unit 203 for generating digital signals to loop around a digital transmission line at a predetermined data channel unit back to one end of the line and test the looped back transmission line. Bitstream generator and detector unit 203 comprises transmitter circuit 501, receiver circuit 502, digital code converter 503, error detector 504, and timer-multiplexer 505 interconnected as shown between loop interface unit 204 and maintenance circuit address, data, and control buses 251-253. Also included in the unit are bus interface buffers 551-553 for transferring address, data, and control signals between maintenance circuit address, data, and control buses 251–253 and address decoder circuit 554, internal data bus 555, and synchronous control circuit 556, respectively. Well-known voltage controlled oscillator 506 provides a constant frequency signal source for digital code converter 503.

Transmitter circuit 501 is a well-known circulating linear feedback shift register comprising parallel-to-serial shift register 560, read/write register 561, multiplexer 562, and exclusive logic OR gate 563 interconnected as shown. Transmitter circuit 501 serially sends various control codes as well as predetermined data patterns to the data channel units in a digital transmission line via digital code converter 503. In response to a data pattern received in a parallel manner on internal data bus 555 from microprocessor 301, the bit pattern is stored in read/write register 561. This is in response to an address signal from microprocessor 301 that is decoded into an enable signal by well-known address decoder circuit 554. In response to a control signal from microprocessor 301, synchronous control cicuit 556 enables read/write register 561 to load the stored bit pattern into shift register 560. After read/write register 561 is loaded, well-known synchornous control circuit receives a signal from microprocessor 301 and enables multiplexer 562 to apply the serial output bits on conductor 580 from shift register 560 to an input of the shift register. This allows shift register 560 to repetitively shift the stored bit pattern and apply it to the digital transmission line via digital code converter 503. Synchronous control circuit 556 is synchronized by clock signals received from the office clock (not shown) via digital code converter 503. To transmit a first control code to a predetermined channel unit and each of the intermediate channel units, microprocessor 301 loads a first eight-bit maintenance code into shift register 560 which serially shifts the first maintenance code on to the transmission line. Next, a second eight-bit maintenance code is loaded in shift register 560 and shifted onto the line. These two maintenance codes are repeatedly applied to the line for at least 48 bytes and followed by 48 bytes of random data for each first control code. As previously suggested, a channel unit will assume a "maintenance" state and translate the code to data. In response to a second received first predetermined control code, a "maintenance" state data channel unit will pass the second received first control code and any subsequently received patterns to the next data channel unit in the transmission line. To connect the transmit path to the receive path of a line, a second predetermined control consisting of at least 48 bytes of the first maintenance code is serially sent to the predetermined channel unit. In response to a second received second predetermined control code, the "maintenance" state data predetermined channel unit will connect the transmit path to the receive path of the four-wire digital transmission line.

To verify that the predetermined channel unit has looped around the digital transmission line, a fixed data test pattern is loaded into transmitter circuit 501 and serially sent on the looped-back transmission line to receiver circuit 502 via digital code converter 503. The received data test pattern is then read by microprocessor 301 from receiver circuit 502. Microprocessor 301 compares the received and transmitted data test pattern. When the transmitted and received data test pattern are the same, microprocessor 301 stores the received data test pattern back into receiver 502. Receiver 502 then sends the stored data pattern to detector circuit 504 which compares the stored data test pattern with any subsequently received data test patterns from the transmission line. When there is a mismatch between the stored and received test patterns, an error signal is sent to processor-office interface unit 202 via timer-multiplexer 505.

Receiver circuit 502 comprises parallel-to-serial shift register 570, write register 571, multiplexer 572, exclusive logic OR gate 573, and a serial-to-parallel read register 574 interconnected as shown. The patterns received from the digital transmission line via digital code converter 503 are loaded into register 574 via conductor 575 and sent to microprocessor 301 via internal data bus 555. The received bit pattern is then written into write register 571 from microprocessor 301 in response to an enable signal from address decoder circuit 554. Similar to transmitter circuit 501, multiplexer 572 receives a mode control signal from synchronous control circuit 556 to select the output conductor 576 from shift register 570 to input conductor 577 of the shift register. The serial output signal of shift register 570 is also applied to an input of detector circuit 504 via conductor 576. In response to a subsequently received control signal from synchronous control circuit 556, the bit pattern stored in write register 571 is loaded into shift register 570 which repeatedly shifts the stored bit pattern and applies it to detector circuit 504.

Detector circuit 504 comprises latch 580 and exclusive logic OR gate 581 interconnected as shown to compare the test pattern received from the digital transmission line and receiver circuit 502. As previously suggested, when the received bit pattern from receiver circuit 502 and the bit pattern from the digital transmission line mismatches, an error signal is sent to latch 580. In response to an enable signal from synchronous control circuit 556, latch 580 via timer-multiplexer 505 transmits the error signals to processor-office interface unit 202.

Well-known digital code converter 503 converts the unipolar 64 Kbps bit patterns received from transmitter circuit 501 to a 56 Kbps bipolar digital signal for loop interface unit 204. In addition, digital code converter circuit 503 converts the 56 Kbps bipolar digital signals received from the loop interface unit 204 to a 64 Kbps unipolar digital signal for receiver circuit 502. Voltage controlled oscillator 506 provides a constant frequency timing signal to the digital code converter which is synchronized with the office clock.

Figure 6:
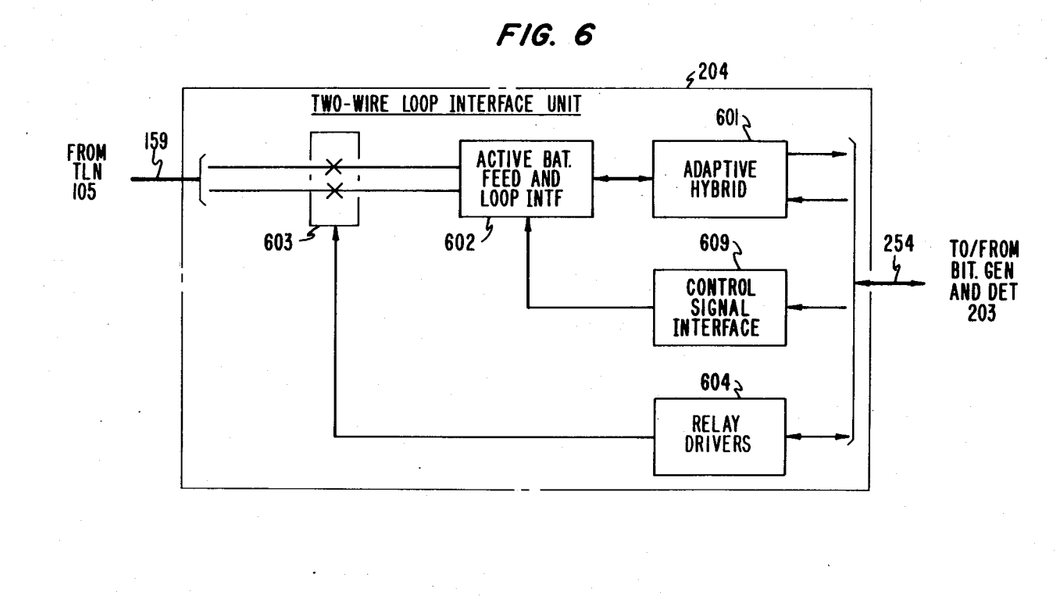
FIG. 6 depicts a detailed block diagram of the loop interface unit in the maintenance circuit of FIG. 2.

Depicted in FIG. 6 is loop interface unit 204 for interfacing unidirectional bipolar 56 Kbps digital signals of bitstream generator and detector unit 203 with the bipolar analog signals of balanced two-wire metallic line 159 to trunk link network 105. Loop interface unit 204 comprises adaptive hybrid circuit 601, active battery line feed circuit 602 under the control of well-known signal interface circuit 609, and "make" relay contact 603 with associated relay driver circuit 604. Well-known adaptive hybrid circuit 601 converts the unidirectional bipolar 56 Kbps digital signals of bitstream generator and detector circuit 203 to the bipolar analog signal of two-wire balanced metallic line 159 and vice-versa. In addition, the adaptive hybrid circuit splits the bidirectional signals on balanced two-wire metallic line 159 into unidirectional transmit and receive signals for bitstream generator and detector circuit 203.

Well-known active battery line feed circuit 602 provides loop current to balanced two-wire metallic line 159 in response to bipolar analog signals from adaptive hybrid 601. In addition, active battery line feed circuit 602 provides supervision for the two-wire metallic line. A detailed description of this active battery line feed circuit is described in U.S. Pat. No. 4,476,350 of D. W. Aull, et al., entitled "Battery Feed" issued Oct. 9, 1984. Well-known "make" relay contacts 603 and associated relay driver 604 control the application of loop current to two-wire metallic line 159 when idle.

Briefly summarizing with an example, to loop back interoffice digital trunk 150 at data channel unit 172, central processor 106 connects maintenance circuit 152 to interoffice digital trunk link 150 via trunk link network 105. Since data channel units 163 and 164 are between switching office 100 and data channel unit 172, central processor 106 will signal maintenance circuit 152 to apply in a serial manner a first predetermined control code for each of data channel units 163, 164, and 172 to assume the "maintenance state". Each data channel unit translates first predetermined control codes to data. When the second received code is another first predetermined control code, the data channel unit will pass the second received first control code and any subsequently received control codes to the next data channel unit. However, when the second received code is a second predetermined control code, the data channel unit connects the transmit path to the receive path of the digital transmission line. Each data channel unit is addressed in the same manner; however, a particular data channel unit may be addressed by the maintenance circuit to loop around the transmission line. With the foregoing in mind, the reader's attention is directed to a description of the data channel unit for looping around the digital transmission line in response to first and second predetermined control codes received from the maintenance circuit.

Figure 7:
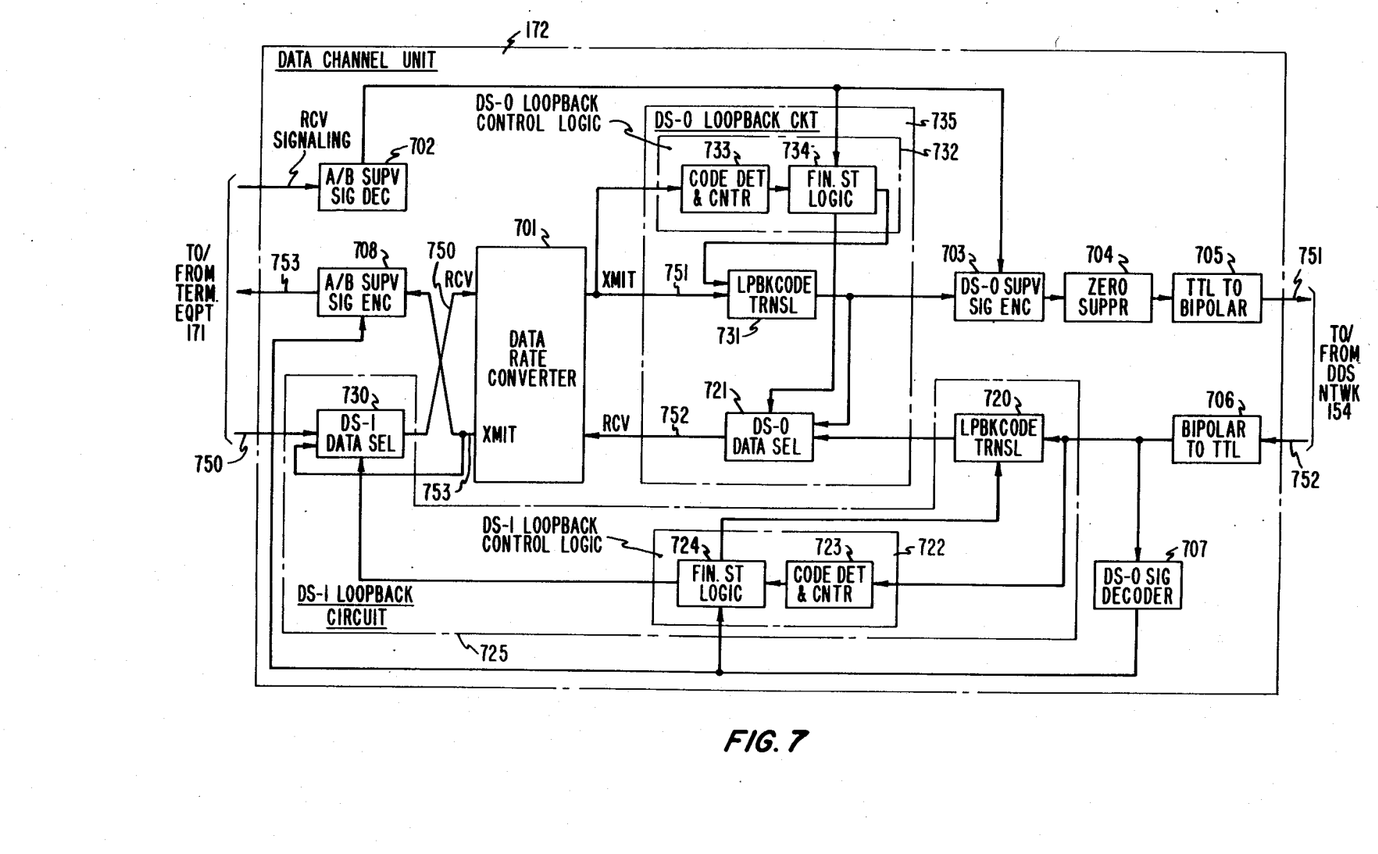
FIG. 7 depicts a detailed block diagram of a data channel unit for looping around a digital transmission line.

Depicted in FIG. 7 is a detailed block diagram of data channel unit 172 which may be inserted into the well-known D-4 channel bank and subscriber loop carrier terminal equipment. Data channel unit 172 converts well-known DS-0 and DS-1 format digital signals between respective digital data system (DDS) network and digital terminal equipment 171. Data channel unit 172 comprises data rate converter 701 for converting DS-1 format digital signals on unidirectional receive (RCV) path 750 to DS-0 format digital signals on unidirectional transmit path 751 to DDS network 154. Also included are A/B bit supervisory signaling decoder 702, and DS-0 supervisory signaling encoder 703 for converting well-known A and B supervisory signaling bits from digital terminal equipment 171 to DS-0 supervisory signals for data channel unit 182 on the other end of DDS network 154. The data channel unit with two-bit A/B supervisory signaling can be in any one of four modes: idle, voice, data, and network control. To loop around the transmission line, the data channel unit must be in the data mode with A/B supervisory signaling decoder 702 so indicating to DS-0 encoder 703 and DS-0 loopback circuit 735. Also included in the transmit path 751 to DDS network 154 are well-known zero byte suppressor 704 and TTL to bipolar signal converter 705. In the opposite direction from DS-0 receive path 752 to DS-1 transmit path 753, commercially available DS-0 supervisory signaling decoder 707 and A/B signaling encoder 708 convert the DS-0 supervisory signaling from data channel unit 182 on the other side of DDS network 154 to well-known A/B signaling for digital terminal equipment 171. In addition, DS-0 supervisory signaling decoder 707 indicates to DS-1 loopback circuit 725 that the data channel unit is in the data mode. Also included in DS-0 receive path 752 is converter 706 for converting well-known bipolar to TTL digital signals.

Data flow from DS-0 receive path 752 to DS-1 transmit path 753 is as follows. DS-0 digital signals on receive path 752 are converted from a bipolar to TTL format by converter 706 and directly passed through loopback code translator 720 and DS-0 data selector 721 to data rate converter 701. Data rate converter 701 converts the DS-0 digital signals to a DS-1 format for transmission on transmit path 753 to terminal equipment 171. From the data rate converter, the DS-1 format signal is passed through A/B signal converter 708 that inserts the appropriate A/B signaling bits. In the opposite direction from DS-1 receive path 750 to DS-0 transmit path 751, DS-1 format digital signals are passed through DS-1 data selector 730 and applied to data rate converter 701. The data rate converter converts the DS-1 format digital signals to DS-0 format signals which are then directly passed through loopback code translator 731 and applied to DS-0 supervisory signaling encoder 703 for insertion of DS-0 supervisory signaling information. The complete DS-0 format digital signals are then passed through zero byte suppression circuit 704 and converted from TTL to bipolar signals by converter 705 for transmission on transmit path 751 to DDS network 154.

Also included in data channel unit 172 are two loopback circuits 725 and 735. DS-0 loopback circuit 735 connects DS-0 transmit path 751 to the DS-0 receive path 752 to loop around the line back to maintenance circuit 152 at switching office 100. DS-1 loopback circuit 725 connects DS-1 transmit path 753 to DS-1 receive path 750 to loop around the line back to maintenance circuit 192 at switching office 101. DS-0 loopback circuit 735 includes DS-0 data selector 721, DS-0 loopback code translator 731, and DS-0 loopback control logic 732 interconnected as shown. DS-1 loopback circuit 725 includes DS-1 loopback code translator 720, DS-1 loopback control logic 722, and DS-1 data selector 730 interconnected as shown. To connect DS-0 transmit path 751 to DS-0 receive path 752 and loop back to digital transmission line to switching office 100, DS-0 data selector 721 directs the digital signals on DS-0 transmit path 751 to DS-0 receive path 752 in response to a loopback select signal from DS-0 loopback control logic 732. To connect DS-1 transmit path 753 to DS-1 receive path 750 and loop back the digital transmission line to switching office 101, DS-1 data selector 730 directs the DS-1 ditial signals from data rate converter 701 on DS-1 transmit path 753 to DS-1 receive path 750 in response to a loopback select signal from DS-1 loopback control logic 722. DS-1 data selector 730 like DS-0 data selector 721 comprises a well-known selectable two-to-one multiplexer for applying DS-1 digital signals to data rate converter 701 from either incoming DS-1 receive path 750 from terminal equipment 171 or DS-1 transmit path 753 from data rate converter 701 in response to a loopback select signal from DS-1 loopback control logic 722.

DS-1 loopback control logic 722 comprises code detector and counter 723 and finite state logic 724 for sending a loopback select signal to DS-1 data selector 730 and a disable signal to loopback code translator 720. As previously described, first, second, and third predetermined control codes are comprised of various 48 byte combinations of two eight-bit maintenance codes.

The first control codes comprises 48 bytes of alternating first and second eight-bit maintenance codes. First control codes are separated by 48 bytes of random data. The second control code comprises 48 bytes of the first maintenance code, and the third control code comprising 48 bytes of the second maintenance code. Well-known code detector and counter 723 detects the type and number of first and second maintenance codes received from DS-0 receive path 752 to indicate the receipt of either a first, second, or third control code from maintenance circuit 102. Well-known finite state logic 724 has a plurality of states to send select signals to DS-1 data selector 730 and enable and disable signals to loopback code translator 720 in response to the control codes from maintenance circuit 192.

Figure 8:
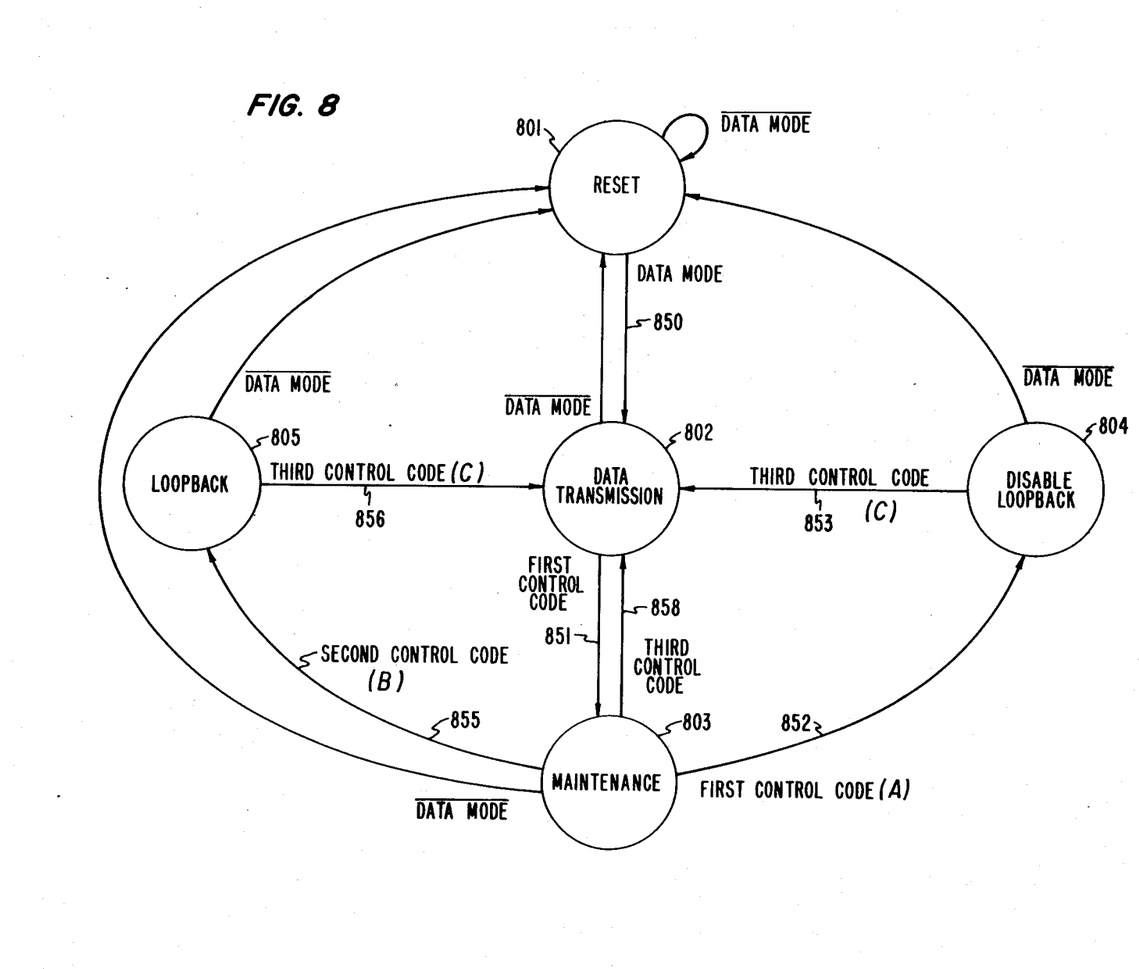
FIG. 8 is a state diagram of the finite state logic in the data channel unit of FIG. 7.

Depicting in FIG. 8 is a state diagram of finite state logic 724 as well as finite state logic 734 comprising "reset, data transmission, maintenance, disable loopback, and loopback" states 801-805. Finite state logic 724 and the channel unit are in "reset" state 801 when voice signals are on the transmission line. When data is sent, the maintenance circuit sends a data mode signal to each channel unit in the line, and each channel unit advances to "data transmission" state 802 as indicated by state transition path 850. This data mode signal is detected by DS-0 signal decoder 707. With finite state logic 724 in the "data transmission" state 802, code detector and counter 723 detects and counts the number of alternating eight-bit first and second maintenance codes to determine when a first predetermined control code has been received. "Data transmission" state finite state logic 724 sends an enable signal to loopback code translator 720 to translate first control codes to data and also sends a select signal to DS-1 data selector 730 to direct DS-1 data from terminal equipment 171 to data rate converter 701. When a first predetermined control code is first received, code detector and counter 723 so indicates this to finite state logic 724 which advances from "data transmission" state 802 to "maintenance" state 803 as indicated in FIG. 8 by state transition path 851. Loopback code translator 720 also receives and translates the first predetermined control code from DS-0 receive path 752 to data. In the "maintenance" state, DS-1 loopback control logic 722 continues to send the same select and enable signals to respective data selector 730 and translator 720 and waits for the receipt of the next control code from maintenance circuit 192. When the second received control code is another first predetermined control code, finite state logic 724 advances to "disable loopback" state 804 as indicated by state transition path 852 and sends a disable signal to loopback code translator 720. Upon receipt of this disable signal, loopback translator 720 is inhibited from translating first control codes to data, and the second and any subsequently received control codes are simply passed on to data rate converter 701.

However, when the second received control code is a second predetermined control code, finite state logic 724 advances from "maintenance" state 803 to "loopback" state 805 as indicated by state transition path 855 and sends a loopback select signal to DS-1 data selector 730. The second predetermined control code consists of 48 serially transmitted bytes of the second maintenance code. DS-1 data selector 730 will then direct any digital signals from DS-1 transmit path 753 to DS-1 receive path 750. Thus, DS-1 transmit path 753 is connected to DS-1 receive path 750 looping around the digital transmission line back to maintenance circuit 192. Finite state logic 724 will remain in "loopback" and "disable loopback" states 804-805 until the receipt of a third predetermined control code the causes the finite state logic to return to "data transmission" state 802 as indicated by state transition paths 853 and 856. Finite state logic 724 will also return to the "data transmission" state via state transition path 858 from "maintenance" state. Upon returning to the "data transmission" state, finite state logic 724 sends an enable signal to loopback code translation 720 and sends a disable loopback select sign to DS-1 data selector 730 to direct DS-1 signals from digital terminal 171 to data rate converter 701.

Unless the maintenance circuit sends a voice mode or idle signal to cause "data transmission" state finite state logic 724 to assume "reset" state 801, logic 724 waits for another predetermined control code from the maintenance circuit 192. Briefly summarizing, upon receipt of two consecutive first predetermined control codes, a channel unit assumes the "disable loopback" state and passes the second received first predetermined control code any subsequently received control codes along with any data onto the next serially connected data channel unit. However, when a first predetermined control code is followed by a second predetermined control code, the data channel unit assumes the "loopback" state and causes the digital transmission line to be looped back to the maintenance circuit for subsequent testing.

Returning the reader's attention to FIG. 7 again, DS-0 loopback circuit 735 includes DS-0 loopback control logic 732, loopback code translator 731, and DS-0 data selector 721 interconnected as shown. DS-0 loopback control logic 732 comprises code detector and counter 733 and finite state logic 734. The DS-0 loopback circuit operates in a manner similar to the DS-1 loopback circuit 725 to interconnect DS-0 transmit path 751 to DS-0 receive path 752.

As previously indicated, FIG. 8 is a state diagram of finite state logic 724, like finite state logic 734, for sending enable and disable signals to loopback code translator 720 and loopback select and disable loopback select signals to DS-1 data selector 730. This state diagram also illustrates how each of the data channel units respond to a series of control codes from a maintenance circuit to either pass any subsequently received control codes to the next data channel unit or to loop around the transmit path to the receive path of the line at the data channel unit back to the maintenance circuit. One skilled in the art should be able to use this state diagram as previously described to design finite state logic 724 and 734.

It is to be understood that the above-described method and apparatus for looping around a digital transmission line is merely an illustrative embodiment of the principles of this invention and that numerous other arrangements may be devised by those skilled in the art without departing from the spirit and scope of this invention.

What is claimed is:

1. For use with a digital transmission line having a plurality of channel units and a transmit and a receive path passing through each of said channel units, each of said channel units being responsive to a receipt of a first predetermined control code succeeded by a receipt of a second predetermined control code for interconnecting said transmit and receive paths passing therethrough and responsive to a first receipt of said first predetermined control code succeeded by a second receipt of said first predetermined control code for passing the second received said first predetermined control code and any subsequently received control codes therethrough; a method for interconnecting said transmit and receive paths passing through a predetermined channel unit to loop around said digital transmission line, comprising the steps of:

applying to one end of said line an individual said first predetermined control code for said predetermined channel unit and for each one of said channel units preceding said predetermined channel unit in said line, and applying to said one line end said second predetermined control code for said predetermined channel unit after applying said first predetermined control code for each of said predetermined and preceding channel units, the time interval between successive applications of any of said first and second control codes to said one line end being arbitrary.

2. The method of claim 1 wherein said step of applying said first predetermined control code for each of said predetermined and preceding channel units comprises the steps of:

applying a first maintenance code,
applying a second maintenance code, and
repeating the previous steps of applying said first and second maintenance codes.

3. The method of claim 1 wherein said step of applying a second predetermined control code to said one line end comprises the steps of repeatedly applying a first maintenance code to said one line end.

4. The method of claim 1 wherein said method further comprises the step of applying a third predetermined control code to said one line end for disconnecting said interconnected transmit and receive paths at said predetermined channel unit.

5. The method of claim 4 wherein said step of applying said third predetermined control code comprises the steps of repeatedly applying a second maintenance code to said one line end.

6. For use with a digital transmission line having a plurality of channel units and a transmit and a receive path passing through each of said unit, apparatus for interconnecting said transmit and receive paths passing through a predetermined channel unit to loop around said digital transmission line, comprising:

first circuit means for applying to one end of said line an individual first control code for said predetermined channel unit and for each one of said channel units preceding said predetermined channel unit in said line followed by a second control code for said predetermined channel unit; and first loopback means at each of said channel units responsive to a first receipt of said first control code succeeded by a second receipt of said first control code for passing the second received said first control code and any subsequently received control codes therethrough and further responsive to a receipt of said first control code succeeded by a receipt of said second control code for interconnecting said transmit and receive paths at said predetermined channel unit. the time interval between successive receipts of any of said first and second control codes being arbitrary.

7. The apparatus of claim 6 wherein said first loopback means at each of said channel units is further responsive to a third control code for disconnecting said interconnect transmit and receive paths at the channel unit and wherein said first circuit means is also for applying to said one line end a third control code for said predetermined channel unit.

8. The apparatus fo claim 7 wherein said first circuit means comprises generator means responsive to data signals for generating said first, second, and third control codes and processor means for sending said data signals to said generator means.

9. The apparatus of claim 8 wherein said first circuit means comprises first interface means for applying said first, second, and third control codes from said generator means to said one line end 10. The apparatus of claim 9 wherein said processor means is responsive to control signals from a central processor for sending said data signals to said generator means and wherein said first circuit means further comprises second interface means for applying said control signals from said central processor to said processor means and said data signals from said processor means to said generator means.

11. The apparatus of claim 6 wherein asid apparatus further comprises second circuit means for applying to an other end of said line an individual said first control code for said predetermined channel unit and for each one of said channel units between said other line end and said predetermined channel unit followed by a second control code for said predetermined channel unit.

12. The apparatus of claim 11 wherein said apparatus further comprises second loopback means at each of said channel units responsive to a first receipt of said first control code succeeded by a second receipt of said first control code from said other line end for passing the second received said first control code and any subsequently received control codes from said other line end through the channel unit and responsive to a receipt of said first control code succeeded by a receipt of said second control code from said other line end for interconnecting said transmit and receive paths at said predetermined channel unit.

13. The apparatus of claim 12 wherein said second loopback means at each of said channel units is further responsive to a third control code from said other line end for disconnecting said interconnected and receive paths at the channel unit and said second circuit means is also for applying to said other line end a third control code for said predetermined channel unit.

14. The apparatus of claim 13 wherein said second circuit means comprises generator means responsive to data signals for generating said first, second, and third control codes and processor means for sending said data signals to said generator means.

15. The apparatus of claim 14 wherein said second circuit means comprises first interface means for applying said first, second, and third control codes from said generator means to said other line end.

16. The apparatus of claim 15 wherein said processor means is responsive to control signals from a central processor for sending said data signals to said generator means and wherein said first circuit means further comprises second interface means for applying said control signals from said central processor to said processor means and said data signals from said processor means to said generator means.

* * * * *